US012660789B2

(12) United States Patent
Graves et al.

(10) Patent No.: US 12,660,789 B2
(45) Date of Patent: Jun. 23, 2026

(54) SELF-CLEANING LITTER BOX

(71) Applicant: Radio Systems Corporation, Knoxville, TN (US)

(72) Inventors: Jason Richard Graves, Knoxville, TN (US); Cody Stricklin, Knoxville, TN (US); Feng Liu, Knoxville, TN (US); Robert A. Nytko, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 0 days.

(21) Appl. No.: 18/538,635

(22) Filed: Dec. 13, 2023

(65) Prior Publication Data

US 2024/0196855 A1 Jun. 20, 2024

(30) Foreign Application Priority Data

Dec. 14, 2022 (CN) ......................... 202211637415.0

(51) Int. Cl.
*A01K 1/01* (2006.01)

(52) U.S. Cl.
CPC .................................... *A01K 1/011* (2013.01)

(58) Field of Classification Search
CPC .............................. A01K 1/011; A01K 1/0114
See application file for complete search history.

(56) References Cited

U.S. PATENT DOCUMENTS

| | | | | |
|---|---|---|---|---|
| 5,477,812 A * | 12/1995 | Waters | A01K 1/0114 119/166 |
| 6,205,954 B1 * | 3/2001 | Bogaerts | A01K 1/0114 119/166 |
| 6,863,026 B2 | 3/2005 | Northrop et al. | |
| 8,161,908 B2 * | 4/2012 | Cook | A01K 1/0114 229/169 |
| 8,166,919 B2 | 5/2012 | Cook et al. | |

(Continued)

FOREIGN PATENT DOCUMENTS

| | | |
|---|---|---|
| KR | 102468912 B1 | 11/2022 |
| WO | 2013192498 A1 | 12/2013 |

OTHER PUBLICATIONS

International Search Report and Written Opinion issued in corresponding application PCT/US2023/083917, dated Apr. 16, 2024.

(Continued)

*Primary Examiner* — Joshua J Michener
*Assistant Examiner* — Nicole Paige Maccrate
(74) *Attorney, Agent, or Firm* — Merchant & Gould, P.C.

(57) ABSTRACT

The disclosed system, methods, and apparatus relates to a self-cleaning litter box. The self-cleaning litter box includes a movable rake. A mechanism controlling the rake can allow for control of the forward/reverse position, the vertical position, and the rotation of the rake using a different path of travel for the forward and reverse traversals of the rake across the litter box. The controlled positioning of the rake can reduce force on the rake and other mechanical components, and more evenly distribute litter. Further, some implementations may include a dumping mechanism that involve the rake flipping so that clumps of pet waste are forcibly removed from the rake by a mechanical impact. Further implementations allow for removal/replacement of the rake.

19 Claims, 13 Drawing Sheets

(56) References Cited

U.S. PATENT DOCUMENTS

| | | | | |
|---|---|---|---|---|
| 9,179,643 | B2 | 11/2015 | Loveday et al. | |
| 2014/0064876 | A1* | 3/2014 | Tseng .................... | F16B 5/0208 411/147 |
| 2014/0069343 | A1* | 3/2014 | Loveday .............. | A01K 1/0132 119/166 |
| 2015/0173323 | A1 | 6/2015 | Plazarte et al. | |
| 2021/0251182 | A1* | 8/2021 | Anderson .............. | A01K 1/011 |

OTHER PUBLICATIONS

International Search Report and Written Opinion for PCT/US2023/083917, mailed Apr. 16, 2024.

* cited by examiner

1400

1410 — Move a rake wheel through a first path from a first end of a litter box

1420 — Sift the rake through litter along a first path

1430 — Flip the rake at a second end of the litter box to force waste into a waste container 1440 — Return the rake through a second path, smoothing the pet litter

SELF-CLEANING LITTER BOX

CROSS REFERENCE TO RELATED APPLICATION

The present application claims priority to Chinese Application No. 202211637415.0, filed Dec. 14, 2022, which is fully incorporated herein by reference.

BACKGROUND

One of the most popular pets is a cat. For indoor cats, the pet owner will need a litter box to contain the animal's waste. Traditionally, a pet owner had to upkeep the litter box manually by shoveling out pet waste and then replacing the litter to prevent an unpleasant odor. Pet owners dislike this process, as it is time consuming and results in dispersed litter within the pet owner's home. Further, manually cleaning the litter box can waste pet litter and money.

Over the years, other solutions have been developed to maintain a litter box. Disposable litter boxes are a one such option. A pet owner can throw away the entire litter box once the litter box is full. These litter boxes eliminated the need to clean, however, disposing a box every time it is full can be expensive, and creates extra waste.

Another solution includes self-cleaning litter boxes. Self-cleaning litter boxes can automatically scoop pet waste into a container for future disposal. During a cleaning process, a rake will proceed through the litter box in a fixed position and orientation. The rake contains sifting prongs that allow the unused litter to pass through while pushing any waste into the container, which may be positioned at one end of the litter box. After passing through the entire box, the rake will then return to its original position through its original path.

Existing self-cleaning litter boxes have significant disadvantages. For example, waste will often clump to the rake. Thus, the pet owner will have to clean the rake themselves periodically, reducing the convenience of such self-cleaning litter box solutions. Further, these rakes are hard to remove from the other components of the litter box for cleaning and/or replacement. The fixed position of the rake also causes an uneven distribution of litter, often pushing much of the litter to one side or the other of the litter box over time, and leaving litter in the middle of the litter box at best thinly dispersed.

It is with respect to these and other general considerations that embodiments have been described.

SUMMARY

In accordance with the present disclosure, the above and other issues are addressed by an improved self-cleaning litter box. Generally, the disclosed system, methods, and apparatus relate to a self-cleaning litter box that includes a movable rake. The mechanism controlling the rake can allow for control of the forward/reverse position, the vertical position, and the rotation of the rake using a different path of travel for the forward and reverse traversals of the rake across the litter box. The controlled positioning of the rake can reduce force on the rake and other mechanical components, and more evenly distribute litter. Further, other embodiments may include a dumping mechanism that involve the rake flipping so that clumps of pet waste are forcibly removed from the rake by a mechanical impact.

In accordance with a first example, a self-cleaning litter box includes a chassis assembly having a first end and a second end, the chassis assembly including a side frame. The self-cleaning litter box further includes: a motor; a waste container at the second end of the chassis assembly; a litter container placed within a lower portion of the chassis assembly; and a rake assembly including a rake, the rake assembly being movable between the first end and the second end of the chassis assembly. The self-cleaning litter box also includes: a carrier assembly attached to the rake assembly; a drive mechanism operably connected to the carrier assembly, the drive mechanism being engageable by the motor to move the carrier assembly between the first end of the chassis assembly and a second end of the chassis assembly. The self-cleaning litter box also includes: a first guide path formed along the side frame, the first guide path defining a first path of travel of the rake from the first end toward the second end. The self-cleaning litter box additionally includes a second guide path formed along the side frame, the second guide path defining a second path of travel of the rake from the second end toward the first end, the second path of travel being higher than the path of travel along at least a portion of the side frame.

In accordance with another example, a cleaning apparatus for automatically cleaning a litter box, the cleaning apparatus includes a rake detachably attached to a support, a rake wheel rotationally attached to the support, and a motor operably connected to the rake wheel, wherein the motor drives a carrier block operably attached to the support via the rake wheel. The cleaning apparatus including a side frame defining a forward wheel path and a return wheel path. The forward wheel path positions the rake to pass at least partially through a litter tray at a first depth. The return wheel path positions the rake to pass at least partially through a litter tray at a second depth shallower than the first depth.

In accordance with another example, a method for cleaning a litter box includes moving a rake wheel through a first path from a first end of a litter box by using a motor, sifting a rake through litter in a litter tray while moving the rake wheel through the first path, flipping the rake at a second end of the litter box toward a waste bin, returning the rake wheel through a second path to the first end of the litter box, the second path being different from the first path, and wherein the rake is positioned along the second path to smooth the pet litter as the rake wheel returns.

BRIEF DESCRIPTION OF THE DRAWINGS

Non-limiting and non-exhaustive examples are described with reference to the following figures.

DETAILED DESCRIPTION

Various embodiments will be described in detail with reference to the drawings. Reference to various embodiments does not limit the scope of the claims attached hereto. Additionally, any examples set forth in this specification are not intended to be limiting and merely set forth some of the many possible embodiments for the appended claims.

As briefly described above, embodiments of the present system, methods, and apparatus are directed to a self-cleaning litter box. In general, the disclosed system can remove pet waste by moving a rake through the litter in an automated (e.g., motorized) manner. During a forward traversal of the rake through the litter, the rake moves through a first path, for example, as guided by a path of travel of a rake wheel. Waste is deposited in a waste container once the rake reaches the end of the litter box. The rake follows a second path on return, to an initial position on an opposite side of the litter box. This causes the rake to sift through the litter at a shallower height. Sifting through the litter at this higher position allows for less force applied to the rake and other mechanical components of the litter box. In some examples, the return height of the rake is selected such that the rake can still smooth the litter, with at least part of the rake is remains below an intended height of litter.

In example embodiments, the rake positioning may be defined by forward and reverse paths traveled by one or more rake wheels positioned along either side of the rake, which travel along paths defined by side frames of the self-cleaning litter box. For example, a pair of rake wheels at each side may travel along defined paths formed in/on the side frames to define the height and angular position of the rake assembly.

In operation, in some implementations, the self-cleaning litter box described herein can also raise a waste bin cover, thereby allowing the rake assembly to dump waste into a waste bin. The mechanism for raising a waste bin cover may be made significantly compact, and may use a toothed engagement arrangement that engages a linear gear, or rack, thereby lifting the waste bin cover. In some embodiments, the rake can be flipped towards the waste bin once the waste bin cover is lifted, thus causing waste to be dropped into the waste bin. The force from the flip helps avoid waste clumping onto the rake.

The above and other features may be achieved via the various embodiments of a self-cleaning litter box as described and depicted herein, in particular in conjunction with FIGS. 1-14.

Figure 1:
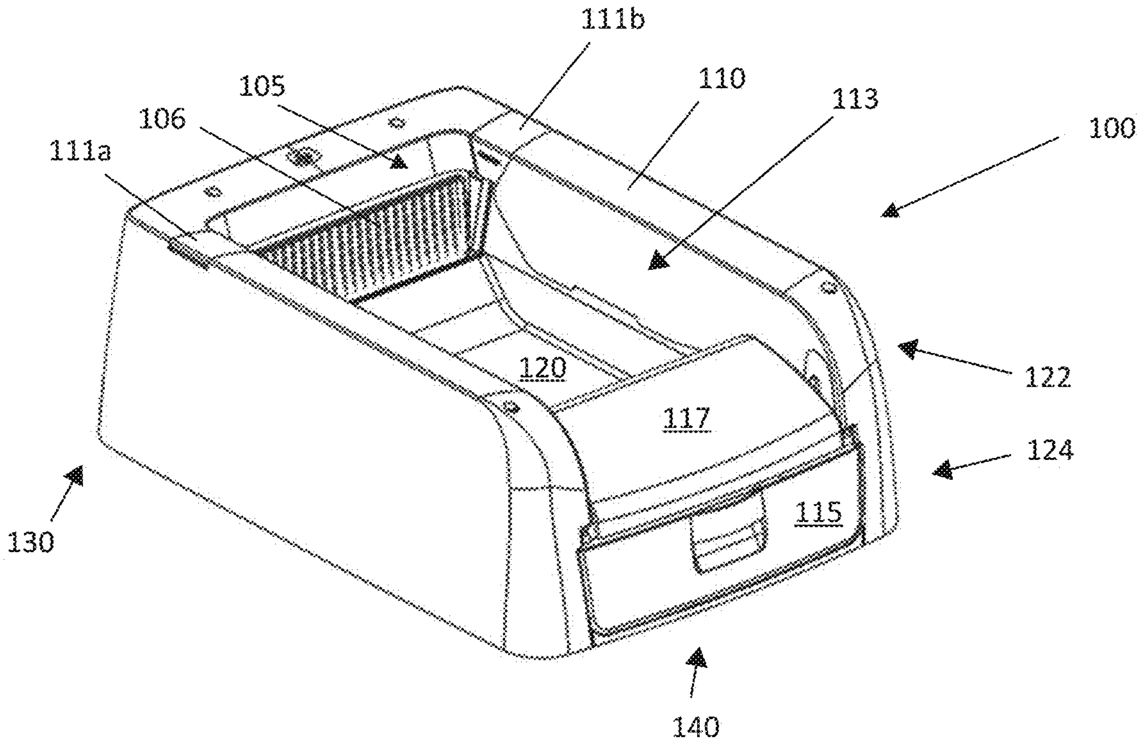
FIG. 1 illustrates an example embodiment showing a top perspective view of a self-cleaning litter box system.
Figure 2:
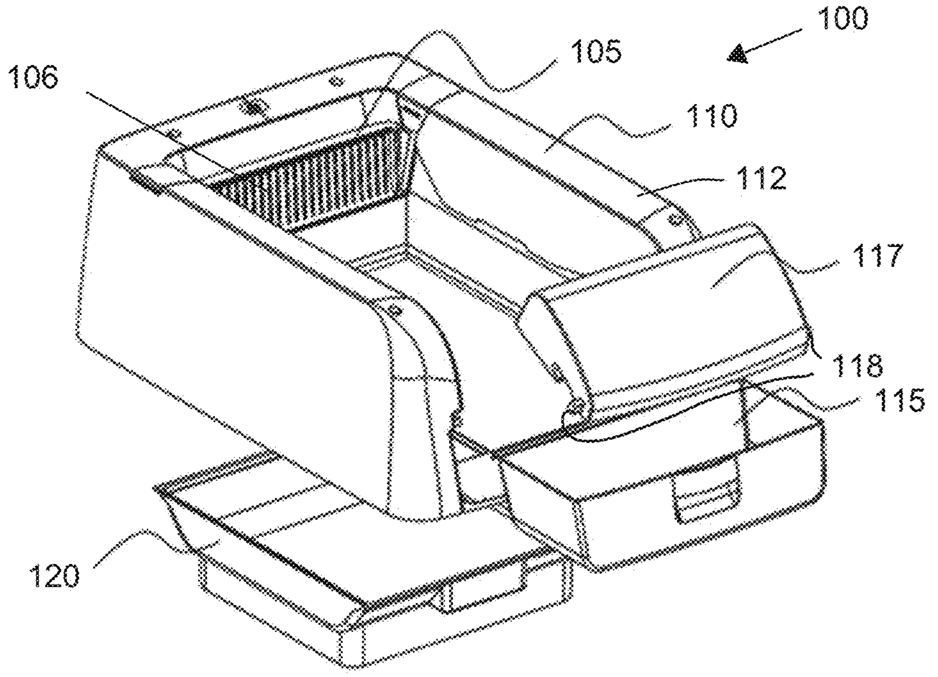
FIG. 2 illustrates an example embodiment showing an exploded top perspective view of the self-cleaning litter system in FIG. 1.

FIGS. 1-2 illustrate an example embodiment of a self-cleaning litter box 100. In this example, the self-cleaning litter box 100 includes a chassis assembly 110, a waste bin 115, and a litter pan 120. Generally speaking, the chassis assembly 110 includes a housing cover 112 having an open top portion 113. The chassis assembly 110 can further be understood to have an upper portion 122 along the top and a lower portion 124 along the bottom. In this example, the litter pan 120 fits within the chassis assembly 110 in the lower portion 124, with the waste bin 115 positioned at one end of the chassis assembly 110. The chassis assembly 110 can be understood to extend between a first end 130 and a second end 140. The second end 140 at which the waste bin 115 is positioned is referred to herein as a "front" of the self-cleaning litter box 100 in some examples herein; however, it is recognized that various configurations are possible.

Throughout this disclosure, references to a "chassis assembly" 110 can also be understood to also be descriptive of the term "chassis" as well. These terms may be used interchangeably at times throughout this specification, figures and claims.

Also, throughout this disclosure, references to a "carrier assembly" 115 can also be understood to also be descriptive of the term "carrier" and/or "carrier block assembly" as well. These terms may be used interchangeably at times throughout this specification, figures and claims.

Further, throughout this disclosure, references to a "waste bin" 115 can also be understood to also be descriptive of the term "waste container" as well. These terms may be used interchangeably at times throughout this specification, figures and claims.

Further, throughout this disclosure, references to a "litter pan" 120 can also be understood to also be descriptive of the term "litter container" and/or the term "litter tray" as well. These terms may be used interchangeably at times throughout this specification, figures and claims.

The litter pan 120 and waste bin 115 may be removable from the self-cleaning litter box 100 in various embodiments. For example, as shown in the exploded view of FIG. 2 in particular, the litter pan 120 may be accessible from (or removable from) either below or above the self-cleaning litter box 100. This can allow for easier replacement of litter once the system begins to run low. Additionally, the waste bin 115 may slide out from an end of the chassis assembly 110 (e.g., a front end as shown in FIGS. 1-2) for easy access and emptying/cleaning. In other embodiments, the litter pan 120 may be removable by sliding in and out from the same end of the chassis assembly 110 as the waste bin 115, for example after removal of the waste bin 115. Other configurations are possible as well, providing other access methods.

A rake assembly 105 traverses over the litter pan 120 between a starting position (as seen in FIG. 1) and an ending position (described further below). As further discussed below, during a forward traversal of the rake assembly 105, a rake 106 included in the rake assembly 105 will generally extend downwardly into the litter pan 120 to sift litter as it moves toward the waste bin 115. In some example implementations, during forward traversal of the rake assembly 105, the rake 106 follows along a bottom surface of the litter pan 120 for at least a portion of the length of travel of the rake 106.

During a reverse, or return, traversal of the rake assembly 105, the rake 106 will return along a return path higher than the forward traversal path, preferably extending downward partially within the litter pan 120 and below an intended level of litter, but to a shallower depth as compared to the depth during the forward traversal.

As the rake assembly 105 approaches the waste bin 115 during the forward traversal, a positioning mechanism (described in further detail below) may cause a waste lid 117 to be opened, thereby allowing clumped litter to be deposited within the waste bin 115. The rake assembly 105 may cooperate with other mechanical components of the self-cleaning litter box 100 to adjust an angular position of the rake 106 as the rake approaches the waste bin 115 as well, for example performing a “flipping” motion to separate any clumped litter from the rake 106.

In some instances, the chassis assembly 110 provides a housing cover 112 that contains a driving apparatus for the rake assembly 105. An example of such a driving apparatus, and specific method of operation, are described in further detail below in conjunction with FIGS. 3-10. Generally speaking, during forward traversal and return traversal, a height and angular position of the rake assembly 105 may be controlled to change to various controlled positions, and thereby enable efficient collection of clumped litter and deposit such clumped litter into the waste bin 115. In particular, during forward traversal the depth and angular position of the rake 106 relative to the litter pan 120 encourage collection of any clumped litter while avoiding pushing all litter into the waste bin 115. During return traversal, the rake position provides appropriate smoothing of litter and reduced stress on motors and/or mechanical components.

In the example shown, the rake assembly 105 is affixed within the chassis assembly 110 at opposite side portions of the chassis assembly 110. The chassis assembly 110 may include, in some examples, cover clip portions 111*a-b*. The cover clip portions 111*a-b* allow access to attachment points of the rake assembly 105, to allow for removal and cleaning/replacement. In the example shown, the cover clip portions 111*a-b* are located along the sides of the chassis assembly 110 such that attachment points of the rake assembly 105 are exposed when the rake assembly 106 is in a starting position, e.g., along a side of the litter pan 120 that is opposite of the waste bin 115. However, other access positions may be used as well.

In the embodiment shown, the rake 106 is shown with prongs or tines (referred to generally herein as prongs) that can sift through litter. While the prongs are placed vertically in this design, other placements are possible. The rake 106 can be made of metal, plastic, or some other strong material.

Figure 7A:
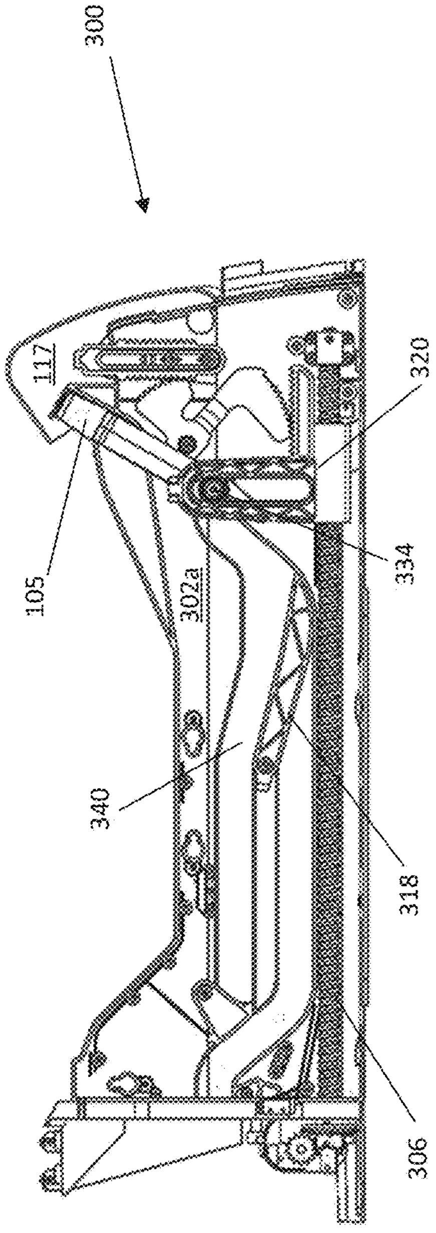
FIG. 7A illustrates a side view of an example embodiment of the rake driving apparatus in the end position after flipping the rake.
Figure 7B:
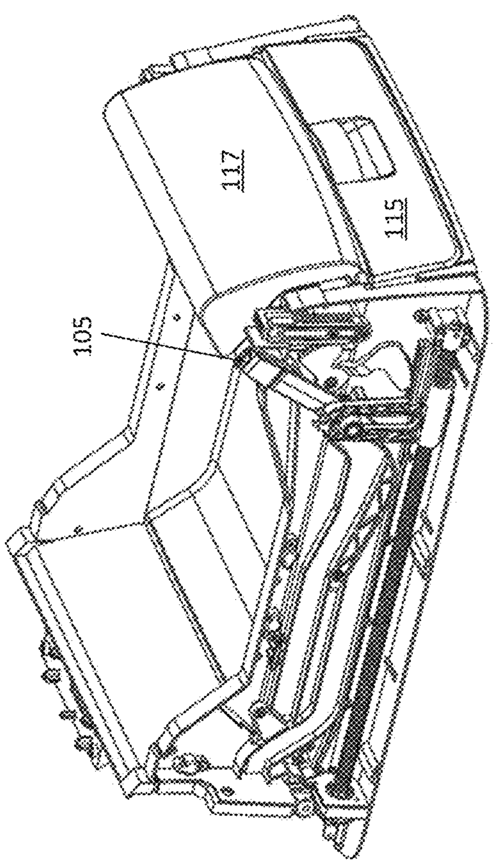
FIG. 7B illustrates a top angle view of an example embodiment of the rake driving apparatus of FIG. 7A.

In the embodiment shown, the waste lid 117 is also shown as having hinges 118 to pivot in relation to the waste bin 115. The hinges 118 allow waste lid 117 to pivot open while the rake 106 dumps waste into the waste bin 115. As is seen in FIG. 3 and FIGS. 7A-B, the rake driving apparatus includes a rack and pinion arrangement operable to open waste lid 117 during forward traversal of the rake assembly 105, in some embodiments.

In addition to the waste bin 115 and litter pan 120, waste lid 117 may also be separable from the chassis assembly 110 to allow for cleaning. For example, the waste bin 115 and waste lid 117 can be separated from the chassis assembly 110 when the waste bin 115 is full of pet waste. Once removed, a pet owner can dispose of the undesired pet waste. In addition to automated opening and closing of the waste lid 117, allowing for removal and cleaning of the waste lid 117 may prevent a pet waste smell from permeating the rest of an owner’s house.

Figure 3:
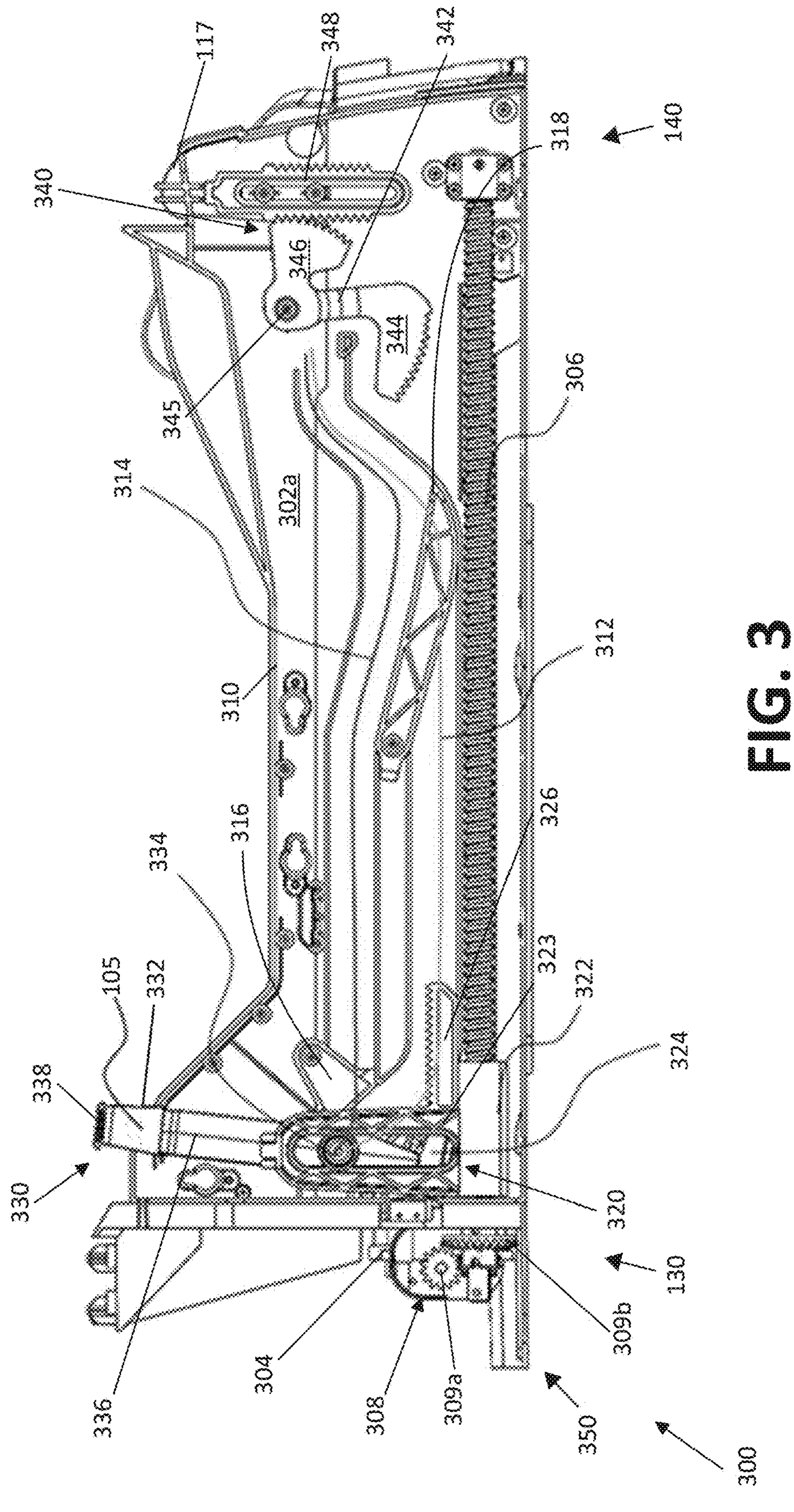
FIG. 3 illustrates a side view of an example embodiment of the self-cleaning litter system with the housing cover removed showing components within, including a rake driving apparatus.
Figure 4:
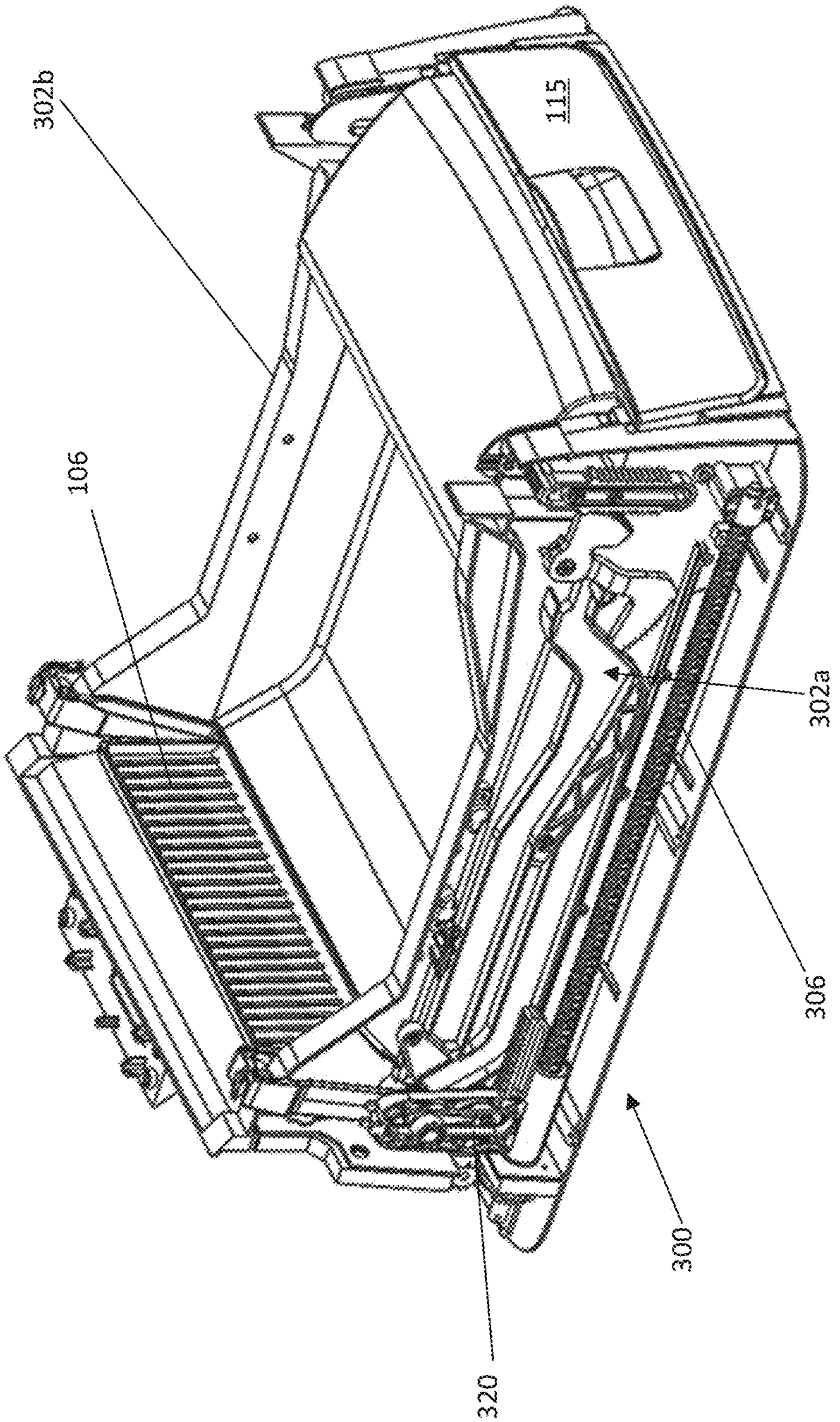
FIG. 4 illustrates a top angle view of an example embodiment of the rake driving apparatus.

Now referring to FIGS. 3-4, further details of a rake driving apparatus 300 included within the self-cleaning litter box 100 are provided. Generally speaking, FIGS. 3-4 illustrate portions of the self-cleaning litter box 100 with the housing cover 112 removed. Waste bin 115 and waste lid 117 are illustrated for discussion purposes.

In the example embodiment shown, the rake driving apparatus 300 includes side frames 302*a-b*, a motor 304, a carrier assembly 320, and a cover positioning mechanism 340.

In the example shown, the side frames 302*a-b* extend between a second (e.g., front) end 140 at which waste bin 115 and waste lid 117 are located, and an opposed first (e.g., rear) end 130 at which motor 304 is mounted. The side frames 302*a-b* cooperate with the waste bin 115 and other frame portions to maintain the litter pan 120 therebetween, generally at lower portion 124 within the frame (as seen in FIG. 4).

The motor 304 is mounted at an end of the rake driving apparatus 300, in this example on the first end 130 opposite the waste bin 115. The motor 304 is operatively connected to a leadscrew 306 via a gear arrangement 308. The leadscrew 306, gear arrangement 308 and other related components provide a drive mechanism 350 for operable connection to the carrier assembly 320 and engagement with the motor 304. In the example shown, the gear arrangement 308 can include a first gear 309*a* and a second gear 309*b*, shown as a beveled gear. The first gear 309*a* is driven by the motor 304, and the second gear 309*b* is coaxial with and in fixed relationship with the leadscrew 306. The first gear 309*a* engages the second gear 309*b*. Accordingly, during operation of the motor 304, rotation of the gear arrangement 308 will cause rotation of the leadscrew 306. Motor 304 may be a servomotor, step motor, DC motor, AC motor, or some other type of small motor that can actuate the gear arrangement 308 to rotate leadscrew 306.

In the example shown, the carrier assembly 320 includes a carrier block 322 including a carrier block slot 324 and a toothed extension 326. The carrier block 322 is positioned surrounding the leadscrew 306 and is operably engaged with the leadscrew 306. The carrier block 322 is positioned and configured to prevent its rotation with the leadscrew 306 during rotation of the leadscrew but may include one or more internal protrusions or other engagement with a threaded exterior of the leadscrew 306 such that rotation of the leadscrew causes axial movement along a central axis of the leadscrew by the carrier block 322. For example, clockwise rotation of the leadscrew 306 may cause the carrier block 322 to move toward the waste bin 115, and counterclockwise rotation of the leadscrew may cause the carrier block to move away from the waste bin 115, and toward the position seen in FIGS. 3-4.

The carrier block 322 includes a vertically oriented extension portion 323 defining a carrier block slot 324. The carrier block slot 324 is positioned to receive a rake wheel, such as a lower rake wheel 334, of the rake assembly 105. The carrier block slot 324 allows for a changing vertical positioning of the rake assembly 105 based on a changed height of the lower rake wheel 334 to allow for depth adjustment of the rake 106 as the rake moves along the forward traversal path and the return traversal path.

In the example shown, the rake assembly 105 includes the rake 106, and further includes a roller assembly 330. The roller assembly 330 includes an upper rake wheel 332 and the lower rake wheel 334. The upper rake wheel 332 and lower rake wheel 334 are attached to support 336. The support 336 receives, above the upper rake wheel, an attachment mechanism 338 useable to attach the rake 106 to the support 336 (details provided below). The support 336, including the upper rake wheel 332 and lower rake wheel 334, are in fixed orientation relative to the rake 106 when the rake is attached via the attachment mechanism 338. Accordingly, the relative positions of the upper rake wheel 332 and lower rake wheel 334 control the position and angle of the rake 106.

In the example shown, the side frames 302*a* and 302*b* each include a top rail 310, and intermediate slots defining a forward wheel path 312 and a return wheel path 314. In some embodiments, forward wheel path 312 may be more broadly understood to teach a first guide path formed along the side frame 302*a* or 302*b* in which the first guide path defines a first path of travel of the rake 106. Likewise, in some embodiments, return wheel path 314 may also be more broadly understood to teach a second guide path formed along the side frame 302*a* or 302*b* in which the second guide path defines a second path of travel of the rake 106.

Although wheel paths 312 and 314 are shown referencing single lines conveying paths of travel for the central location of a rake wheel in FIG. 3, for example, these terms should not be narrowly interpreted. Wheel paths and guide paths discussed throughout this disclosure should be more broadly understood to encompass those structural elements formed along the side frames that defining such paths and should be broadly interpreted at times throughout this disclosure as such.

The side frames 302*a* and 302*b* each also include one-way gates 316, 318. In the example shown, the top rail 310 has a contoured shape used to define a path of travel for the upper rake wheel 332 when the rake assembly 105 is moved from the position seen in FIGS. 3-4 in a forward traversal toward the waste bin, and in a rearward traversal returning to the position shown. The forward wheel path 312 also has a contoured, or curvilinear, shape, and defines a path of travel for the lower rake wheel 334 when the rake assembly 105 is moved from the position seen in FIGS. 3-4 in a forward traversal toward the waste bin 115. The return wheel path 314 has a similar contoured or curvilinear shape, and defines a path of travel for the lower rake wheel 334 when the rake assembly 105 is moved from a position proximate the waste bin 115 to a return position shown. The one-way gates 316, 318 allow transition of the lower rake wheel 334 between the forward wheel path 312 and the return wheel path 314, as further described below.

As mentioned previously, the carrier block slot 324 accommodates vertical movement of the lower rake wheel 334 along a range of heights as the rake assembly 105 is moved by the carrier assembly 320. The range of vertical movement of the carrier block slot 324 is selected to accommodate the varying height of the lower rake wheel 334 as it passes along the contoured shapes and differing heights of the forward wheel path 312 and the return wheel path 314.

In the example shown, the cover positioning mechanism 340 includes a pivotable arrangement 342 including a carrier engagement portion 344 and a pinion portion 346 in a fixed relationship to each other, and which are pivotable about a central axis pin 345. In the example shown, the carrier engagement portion 344 engages the toothed extension 326 of the carrier block 322 as the carrier block 322 is moved toward the waste bin 315 by the leadscrew 306. Engagement between teeth of the toothed extension 326 and the carrier engagement portion 344, respectively, causes pivoting of the lever arrangement 342 in a direction of movement of the carrier block 322, which rotates pinion portion 346 upward. The pinion portion 346 engages a linear gear 348 that is engaged with the waste lid 117, thereby lifting the waste lid 117. The cover positioning mechanism 340 thereby provides a compact arrangement that translates compact horizontal movement to vertical movement of the linear gear 348.

In example implementations, the rake driving apparatus 300 includes complementary drive components positioned along each of the side frames 302*a* and 302*b*. Either of the side frames also being shown or referred to at times generally with reference numeral 302 in this disclosure. Specifically, although the above components are shown as being positioned alongside frame 302*a*, the rake driving apparatus 300 may include a second leadscrew 306, carrier assembly 320, and components of the rake assembly 105 (including upper rake wheel 332, lower rake wheel 334, support 336, attachment mechanism 338, and cover positioning mechanism 340 alongside frame 302(*b*). Furthermore, side frames 302*a* and 302*b* each have analogous features defining a respective top rail 310, as well as a forward wheel path 312 and return wheel path 314, including one-way gates 316, 318. For this reason, although only one side of the rake driving apparatus 300 is described, it is understood that complementary mechanisms may be located along an opposite side.

In some alternative examples, aspects may differ between the respective sides of the rake driving apparatus 300. For example, portions of the carrier assembly 320 may differ on opposite sides; for example, the leadscrew 306 may be located along only one of the side frames, if it is acceptable to apply force to only one side of the rake assembly 105 as translated to it from the respective roller assemblies 330. Additionally, the cover positioning mechanism 340 may be located along only one side frame 302*a*, or along both side frames 302*a* and 302*b*.

Turning now to FIG. 4 as well as FIGS. 5A—FIG. 9B, an example sequence of actuating the rake driving apparatus 300 is discussed. In FIG. 4, the rake driving apparatus is illustrated in an example initial position. In this arrangement, the rake is in a generally vertical orientation, positioned generally above the litter pan 120, and at an end of the litter pan opposite the waste bin 115. At a desired time, the motor 304 will initiate operation, and start rotation of leadscrews 306 as previously described, moving the carrier assembly 320 toward the waste bin, in a forward traversal.

Figure 5A:
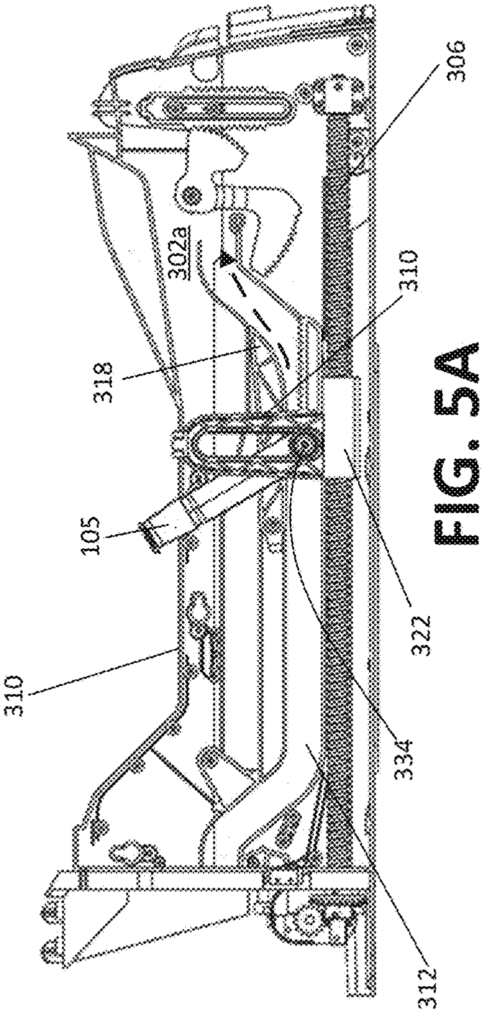
FIG. 5A illustrates a side view of an example embodiment of the rake driving apparatus of FIG. 4, with a carrier assembly at a midpoint position during a forward traversal of the rake assembly.
Figure 5B:
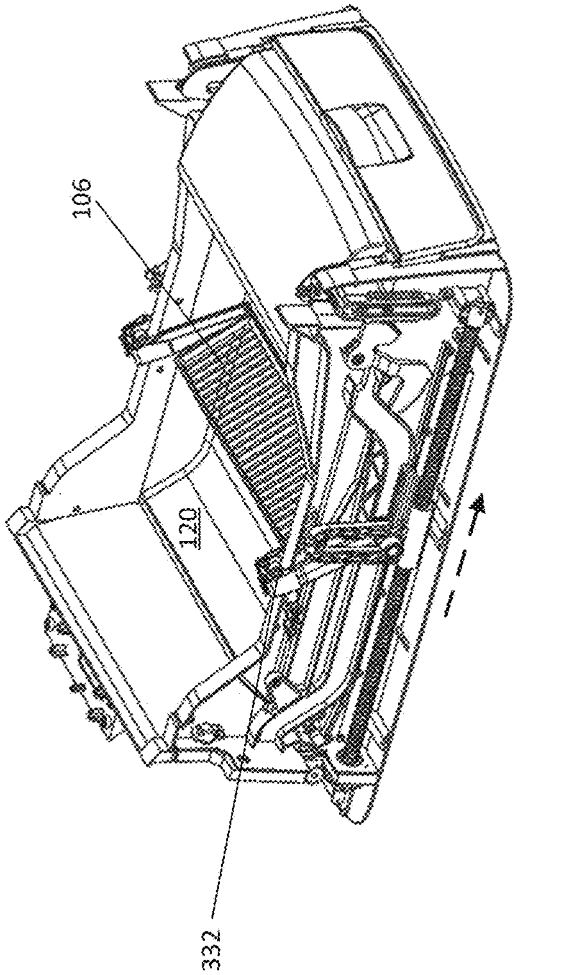
FIG. 5B illustrates a top angle view of an example embodiment of the rake driving apparatus of FIG. 5A.

FIGS. 5A-5B illustrate an example of the midpoint position along that forward traversal. In the example shown, the carrier block 322 is located midway along the leadscrew 306, and the lower rake wheel 334 is positioned within the forward wheel path 312. As the rake 106 moves through the litter, it follows a curvilinear path defined by the forward wheel path 312. Because the lower rake wheel 334 is positioned near a bottom of the rake 106 and the rake 106 is pushing against litter (not shown) a top portion of the rake 106 is held back at an angled position seen in FIGS. 5A-5B, with the angle defined by the position of the forward wheel path 312 and height of the top rail 310 which engages with the upper rake wheel 332. This slight tilt allows rake 106 to effectively sift through the litter for pet waste. As the lower rake wheel 334 continues along the forward wheel path, it will encourage the one-way gate 318 (also referred to as the end gate) upward to allow the lower rake wheel 334 to bypass that gate, and will continue along a path approaching or contacting a bottom surface of the litter pan 120.

Figure 6A:
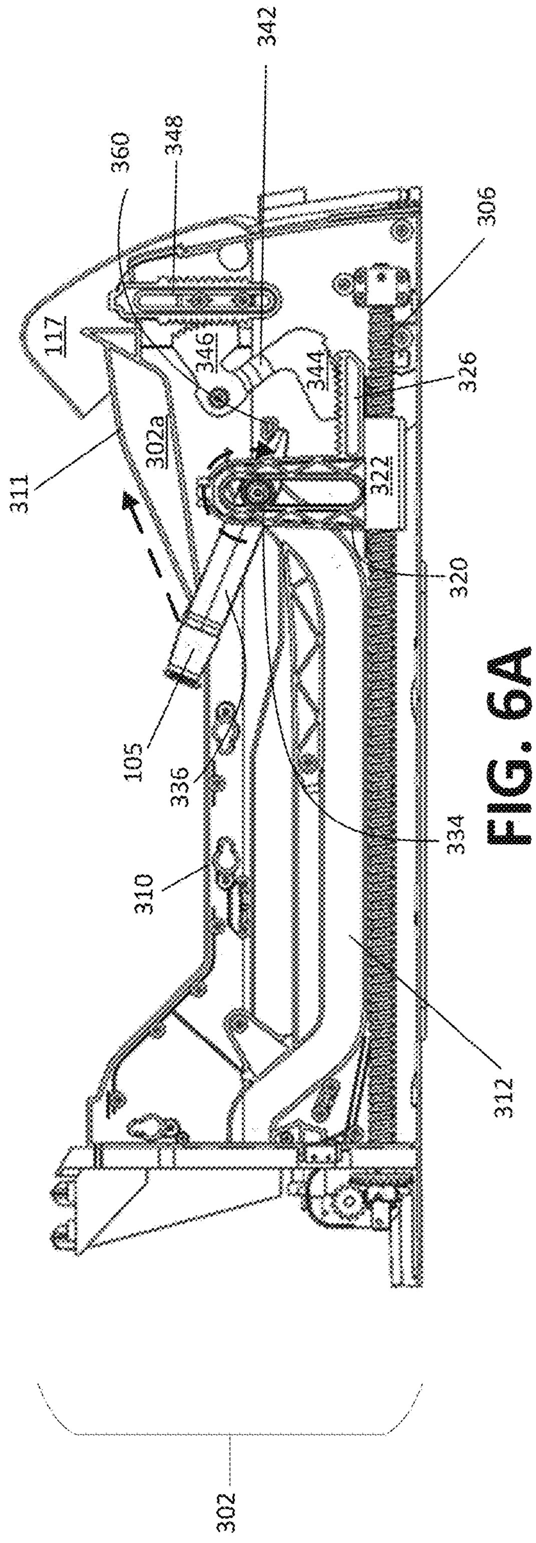
FIG. 6A illustrates a side view of an example embodiment of the rake driving apparatus at the end point position during a forward traversal of the rake assembly before flipping of the rake.
Figure 6B:
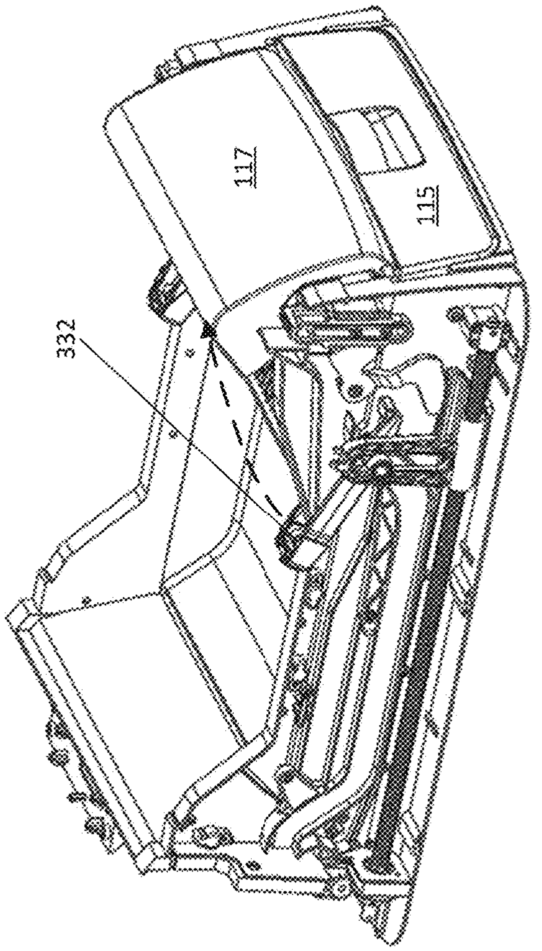
FIG. 6B illustrates a top angle view of an example embodiment of the rake driving apparatus of FIG. 6A.

FIGS. 6A-6B illustrate an example of a position of the rake assembly 105 approaching an end of a forward traversal path, for example immediately prior to a "flipping" operation of the rake 106. In this example, the rake assembly 105 is approaching an end of the self-cleaning litter box proximate the waste bin 115, and, following the forward wheel path 312, has begun to raise out of the litter pan 120, based on an upward-oriented end portion of the forward wheel path 312. In this position, the carrier assembly 320 is approaching an end of the leadscrew 306, and the carrier engagement portion 344 and toothed extension 326 are intermeshed, causing pivoting of the pivotable arrangement 342 to raise the pinion portion 346 and intermeshed linear gear 348. This lifts the waste lid 117.

Further, the upper rake wheel 332 connected to the rake assembly 105 will climb up an end ramp 311 portion of the top rail 310 to help flip the rake 106 towards the end position. Additionally, at least a portion of the rake assembly 105 (e.g., a portion of the support 336 extending past the lower rake wheel 334) contacts a boss piece 360 extending outwardly from the side frame 302*a*. In response to the leadscrew 306 continuing to linearly drive the carrier block 322 toward the waste bin 115, a force is applied to this contacting portion of the support 336 by the boss piece 360. Accordingly, a pivoting of the rake assembly 105 is controlled by the position of the lower rake wheel 334 and the engagement between the support 336 and the boss piece 360, causing a flipping motion of the rake 106. For example, the lower rake wheel 334 and rake assembly 105 may rotate about the axis of the lower rake wheel 334 as shown in FIG. 6A. Alternatively, the lower rake wheel 334 may be fixed and only the rake assembly 105 may rotate in the same way. In addition to the rake assembly 105 rotating towards the waste bin 115, the rake 106 will rotate in the same way and flip, thus dumping any pet waste into the waste bin 115.

FIGS. 7A-7B illustrate an example embodiment of the rake driving apparatus 300 in the end position after flipping. In this example, the carrier assembly 320 has reached a practical end of its intended travel path along the leadscrew 306. As shown, rake assembly 105 has flipped and dumped pet waste into the waste bin 115. Waste lid 117 is in the open position. Also, one-way gate 318 (e.g., the end gate) has returned to its original lowered position, which will allow the lower rake wheel 334 to take the return wheel path 314 as a return traverse occurs, returning the rake assembly 105 to the home position.

Figure 8A:
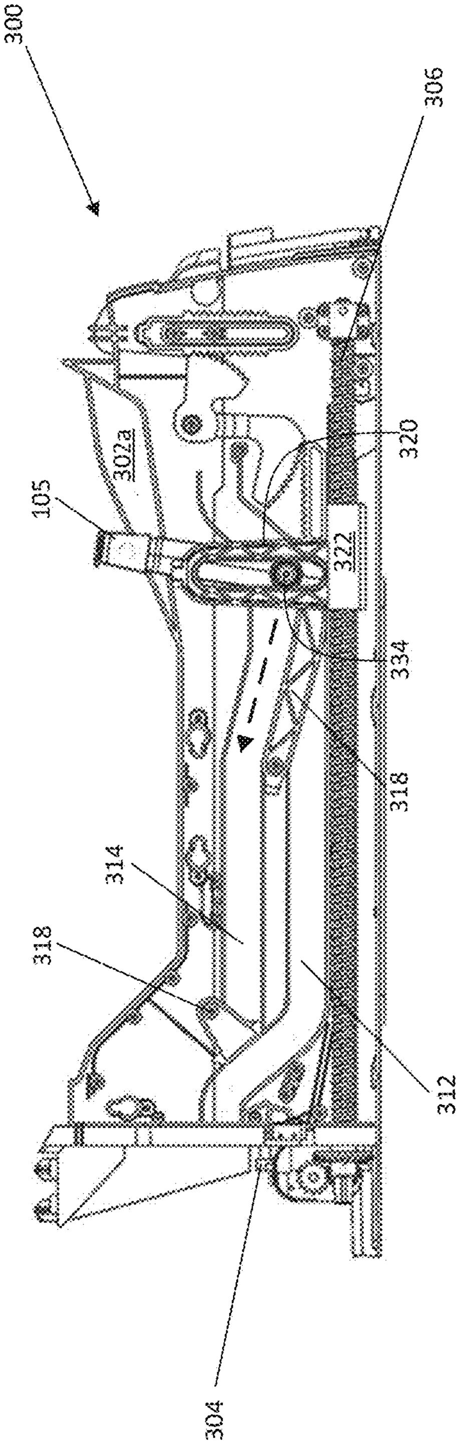
FIG. 8A illustrates a side view of an example embodiment of the rake driving apparatus, with the rake assembly returning to the home position.
Figure 8B:
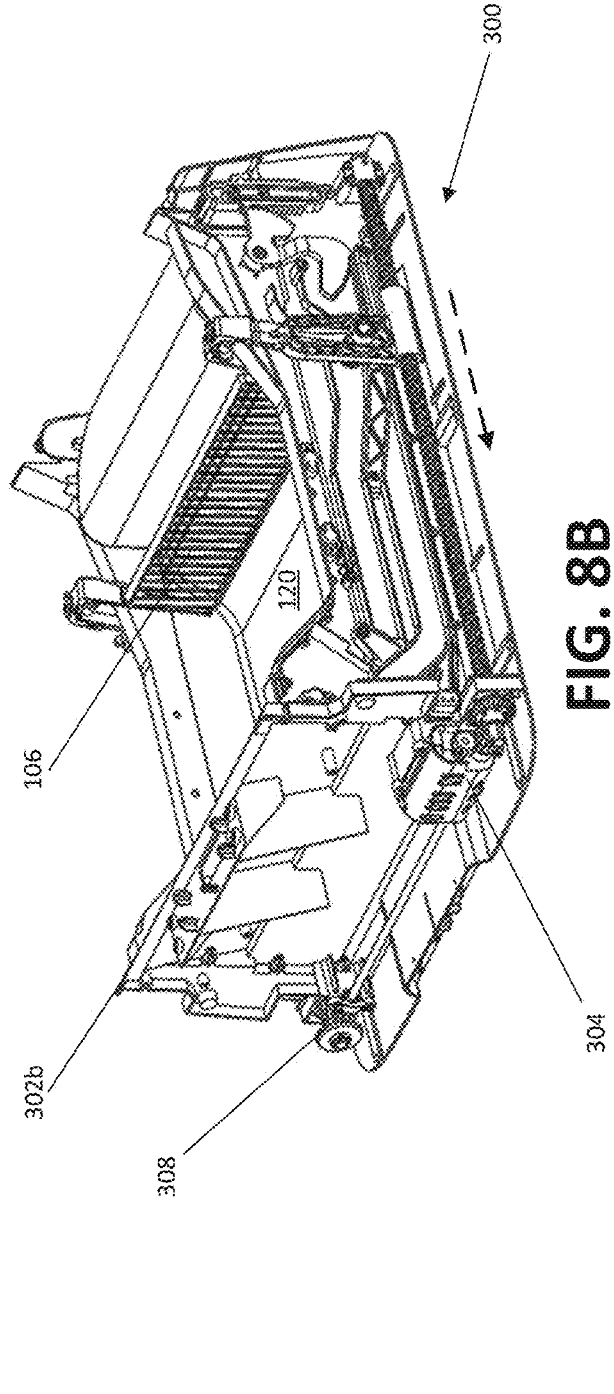
FIG. 8B illustrates a top angle view of the rake driving apparatus of FIG. 8A.

FIGS. 8A-8B illustrate an example embodiment of the rake driving apparatus 300 returning to the home position. In the example shown, the combination of the carrier assembly 320, lower rake wheel 334, and rake assembly 105 is now moving along a return traversal path towards the home position and away from the end position. The motor 304 has reversed its rotation direction, and therefore the rotation direction of leadscrew 306, to move the combination back towards the home position. As the carrier assembly 320 moves away from the waste bin 115, the one-way gate 318 is closed, or lowered, and the lower rake wheel 334 can take the return wheel path 314 as a result. The return path begins, at least in part, along the forward wheel path 312, but passes over one-way gate 318, thereby causing the return wheel path 314 to be higher than the forward wheel path 312. This initial lowering of the rake 106 has the effect of partially scooping some litter back away from the waste bin 115 for even dispersal.

Further, the rake assembly 105 and rake 106 are still flipped towards the end position. Due to the rake being flipped and the lower rake wheel 334 moving in the return wheel path 314 which is higher than the forward wheel path 312, the rake 106 is now at a higher position relative to the litter pan 120 than when the lower rake wheel 334 was moving in the forward wheel path 312. This effect provides the benefit of the rake 106 only sifting through the top level of litter, in particular once the rake 106 and lower rake wheel 334 bypass the one-way gate 318. This has the effect of applying less wear and force on the rake 106, motor 304, and other mechanical linkage components. Applying a reduced force to the rake 106 helps improve the lifespan of the components of the rake driving apparatus 300. Further, it still allows the litter to be smoothed out.

Other designs for the return wheel path 314 can also be contemplated. While not shown, the return path may involve the rake traveling at varying heights. In the example shown, a difference between the forward wheel path 312 and the return wheel path 314 results in a difference in rake heights of approximately 25-40 mm, or in some instances about 35 mm. The distance between the forward wheel path 312 and the return wheel path 314 may be constant along the length of the respective paths, or may be varied as well. The different paths may cause the rake to at some points travel within the litter and travel outside the litter at other points (in particular, along the return wheel path, but also dependent on the current level of litter within the litter pan 120). Other embodiments may involve more gates interacting with the return path than just the one-way gates 316, 318 shown.

Additionally, and in particular as seen in FIG. 8B, a second gear arrangement 308 is shown on an opposite side frame 302*b* of the rake driving apparatus 300, thereby illustrating analogous operation of a leadscrew 306 and carrier assembly 320 on opposite sides thereof.

Figure 9A:
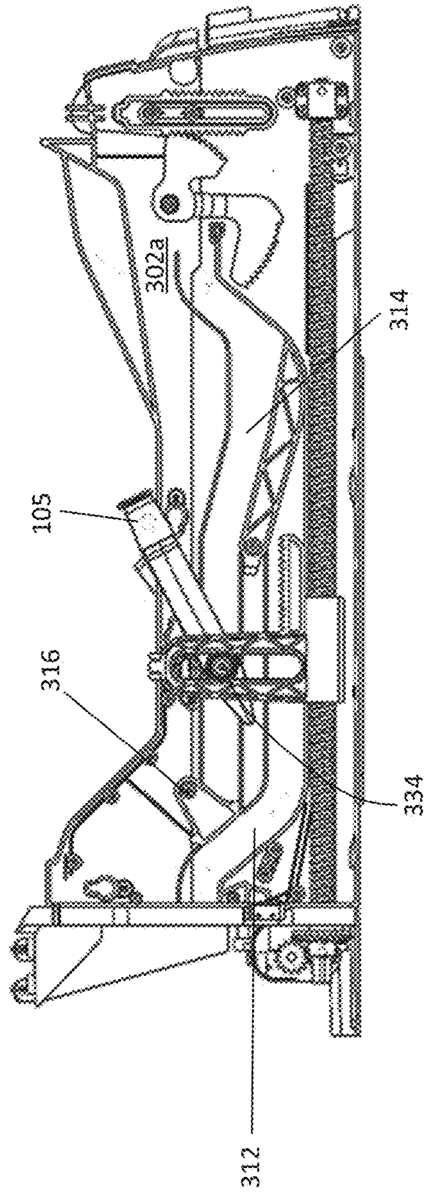
FIG. 9A illustrates a side view of an example embodiment of the rake driving apparatus moving towards the home gate.
Figure 9B:
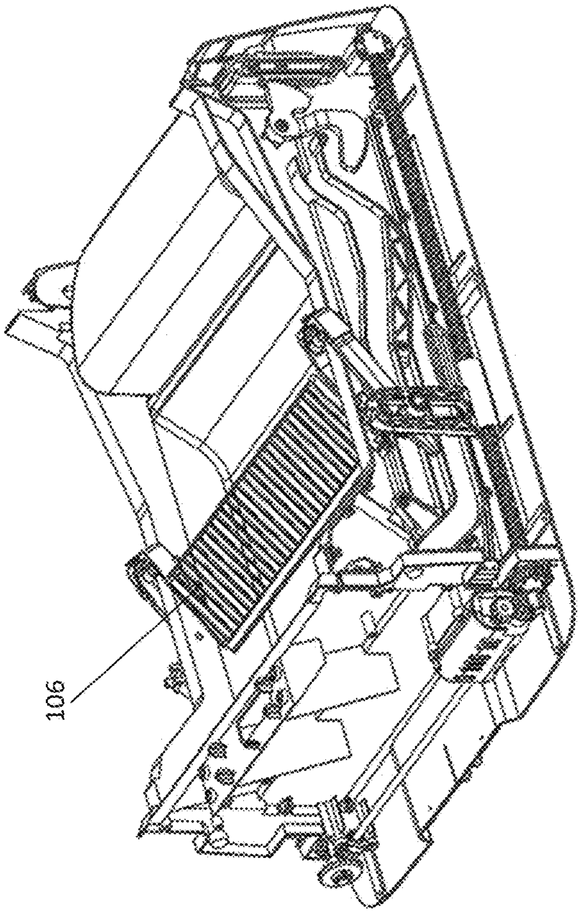
FIG. 9B illustrates a top view angle of the rake driving apparatus of FIG. 9A.

FIGS. 9A-9B illustrate the rake driving apparatus 300 moving towards the home gate 316 with the lower rake wheel 334 within the return wheel path 314. The rake assembly 105 is still flipped to be leaned/rotated towards the end position. As previously discussed, the rake 106 is at a higher position than when the lower rake wheel 334 was moving through the forward wheel path 312. At this location, the rake 106 is no longer lowered to dig into the litter, but is preferably at a height such that only a portion of the rake 106 extends below a surface of the litter to smooth out a top surface of the litter.

Figure 10A:
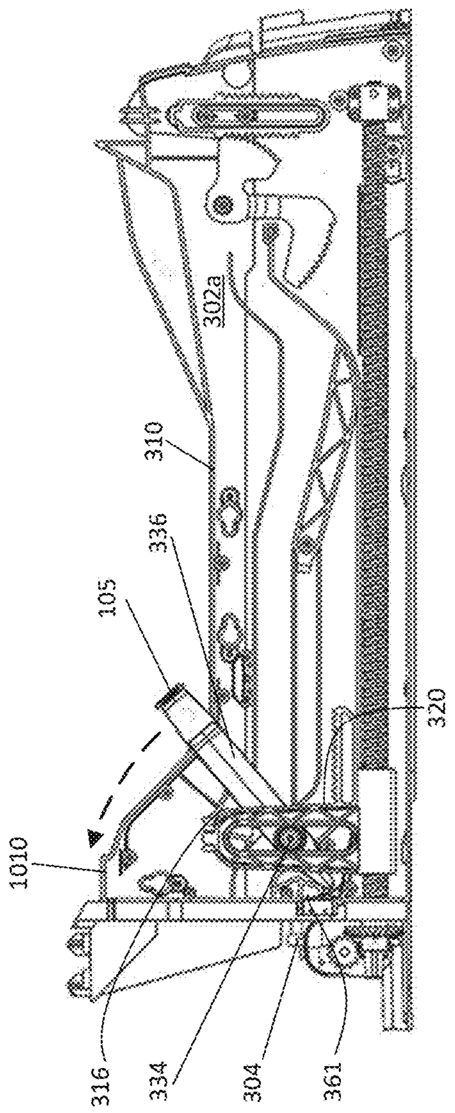
FIG. 10A illustrates an example embodiment of a side view of the rake driving apparatus approaching the home position.
Figure 10B:
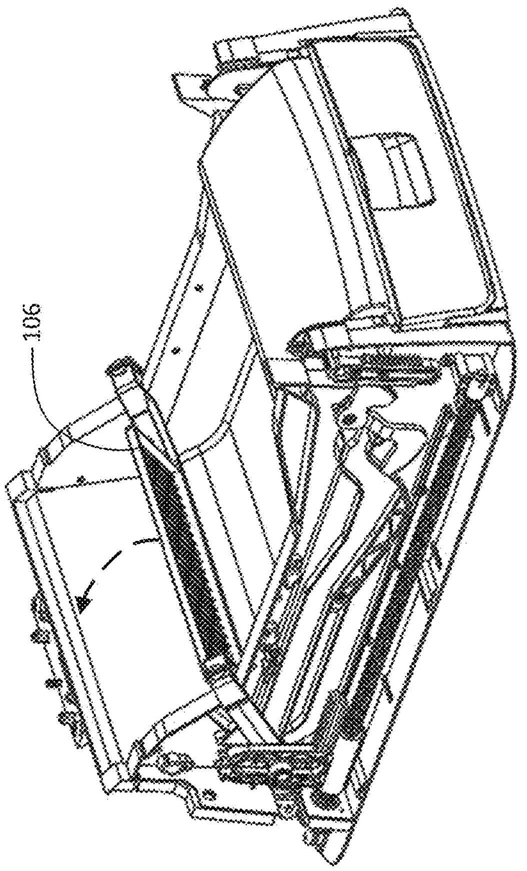
FIG. 10B illustrates a top angle view of the rake driving apparatus of FIG. 10A.

FIGS. 10A-B illustrate the rake driving apparatus 300 approaching the home position. The lower rake wheel 334 passes through the one-way gate 316, which pivots upward out of the way to allow the lower rake wheel past (as in FIG. 10A), and then returns to a home position (seen in FIG. 4). In addition, a portion of the rake assembly 105 contacts another boss piece 361. As the motor 304 continues to pull the carrier assembly 320 back to the home position, the boss piece 361 will apply a force to the lower portion of the support 336 of rake assembly 105. As a result, the rake assembly 105 will flip back to its home position causing lower rake wheel 334 and the rake 106 to flip back to their home positions as depicted by the arrows in FIG. 10A and FIG. 10B, returning to the position seen in FIG. 4. As previously mentioned, the lower rake wheel 334 may not rotate while the rake assembly 105 and rake 106 do. Further, the upper rake wheel 332 will travel up a ramp 1010 portion of the top rail 310, so that rake 106 can return to its home position outside the litter.

Figure 11:
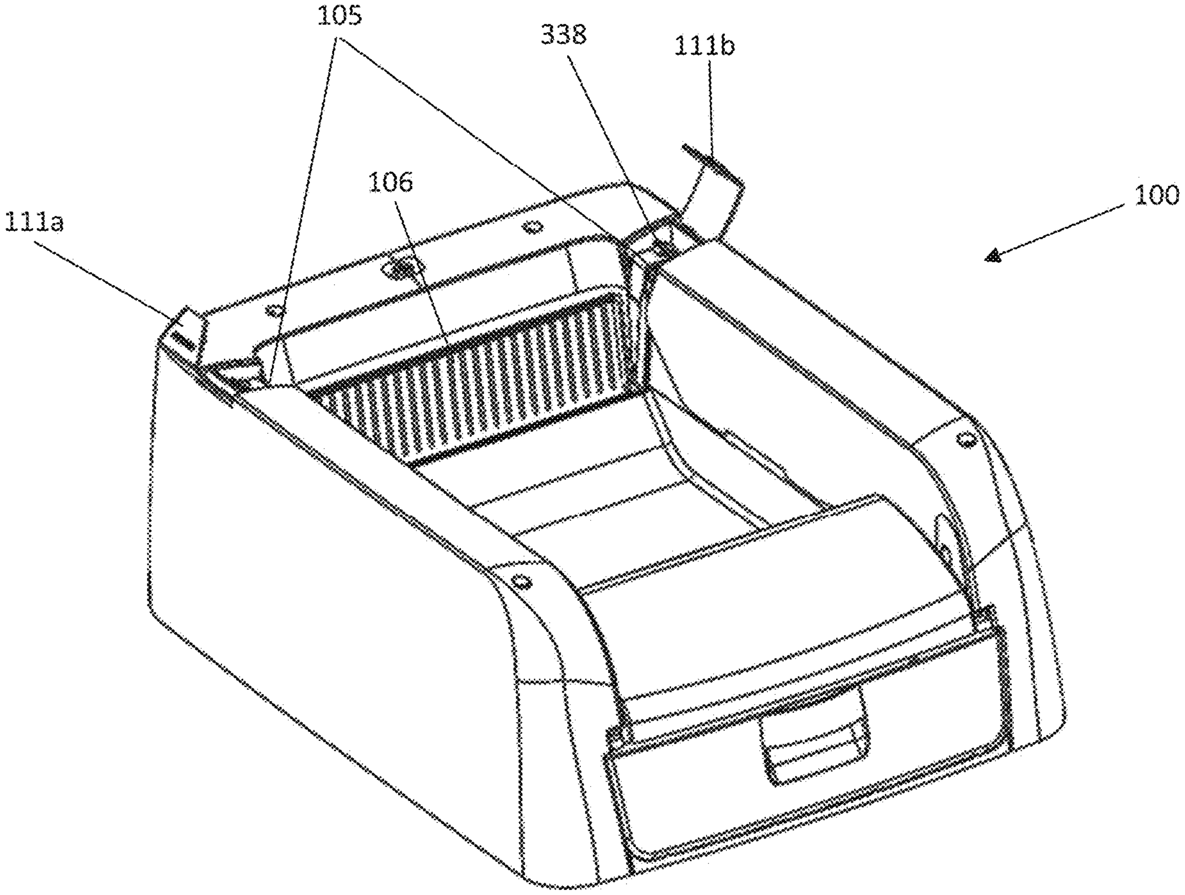
FIG. 11 illustrates a top angle view of the self-cleaning litter box system of FIG. 1, illustrating access for replacement of the rake.
Figure 12:
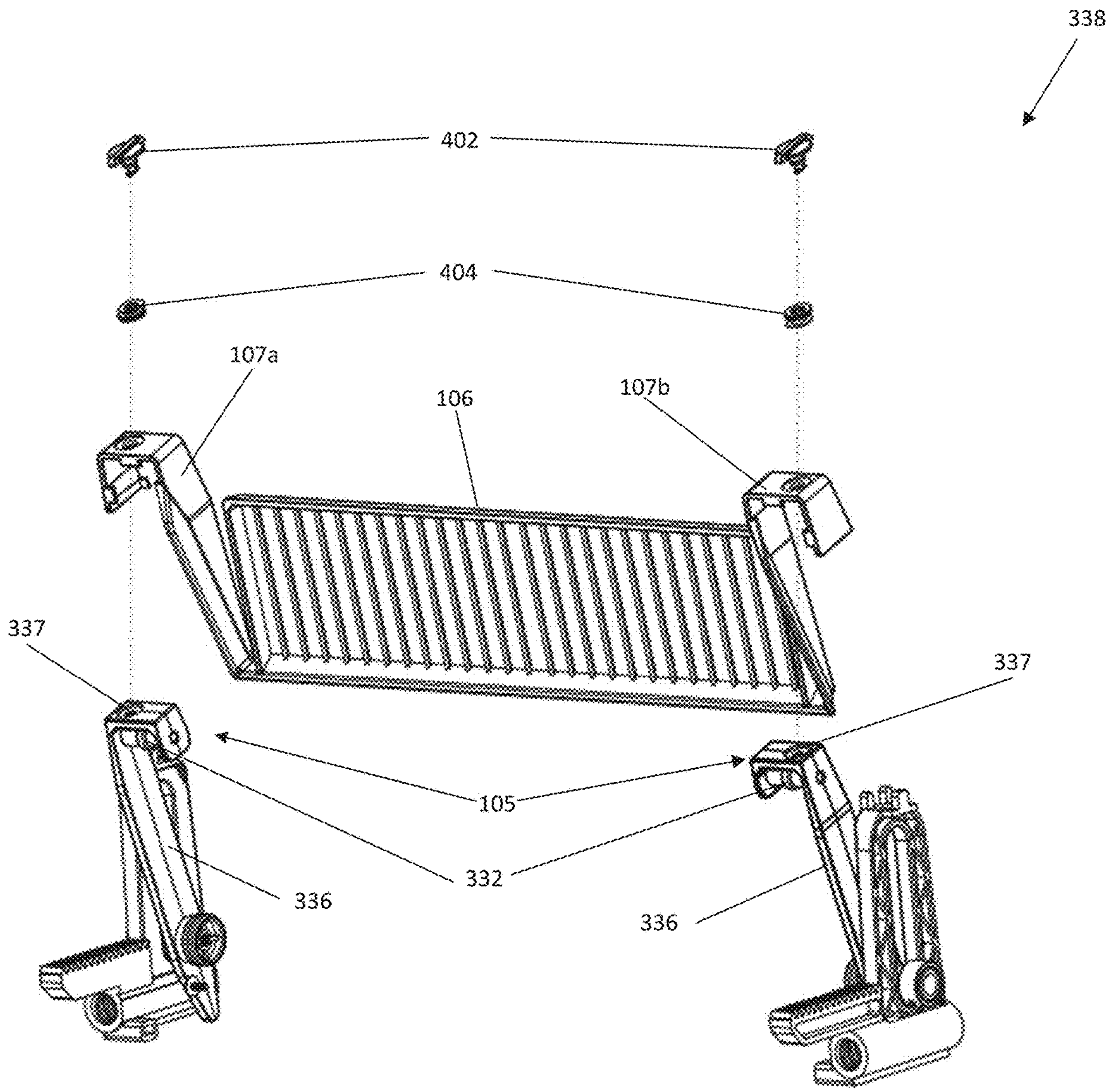
FIG. 12 illustrates an exploded view of a rake assembly and carrier assembly, in accordance with example embodiments.
Figure 13:
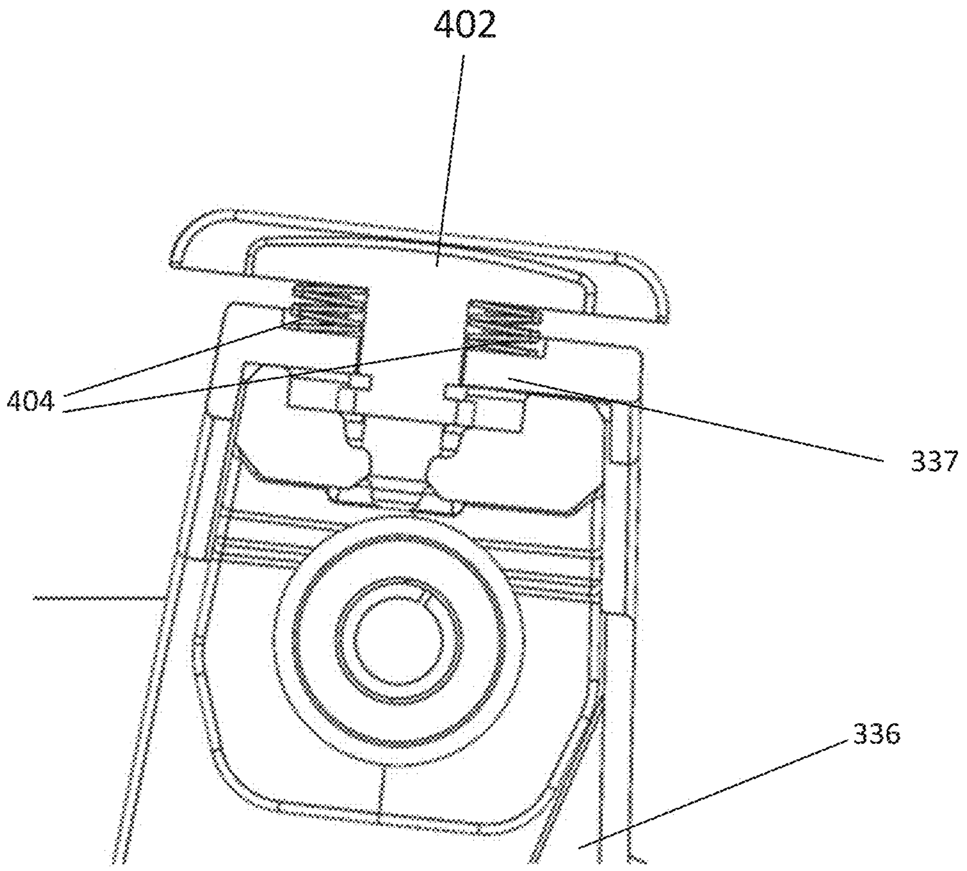
FIG. 13 illustrates a side cross-sectional view of a rake attachment mechanism, according to an example embodiment.

Referring now to FIGS. 11-13, details regarding an example structure of the rake assembly 105 are provided. In particular, structures for removing and replacing the rake 106 within the self-cleaning litter box 100 are illustrated. In the example shown in FIG. 11, cover clip portions 111*a-b* on the chassis assembly 110 provide access to a connection point of the rake 106 to remaining portions of rake assembly 105. The cover clip portions 111*a-b* may be separable entirely from the chassis assembly 110, or may be pivotable portions of chassis assembly 110. Once the cover clip portions 111*a-b* are open, attachment mechanism 338 is exposed. As discussed below in conjunction with FIGS. 12-13, the attachment mechanism 338 attaches the rake 106 to the support 336 near the upper rake wheel 332. The attachment mechanism 338 may, as discussed below, be implemented as a spring-loaded lock that can be twisted to allow for the removal of rake 106. Other means of securing the rake 106 to the support 336 of rake assembly 105 are possible as well such as a screw, clip, or bolt. The cover clip portions 111*a-b* conceal the connection points of the rake 106 and support 336 of rake assembly 105, thus creating a more sanitary experience for the user.

FIGS. 12-13 illustrate details of an example attachment mechanism 338 useable within the self-cleaning litter box 100. In particular, in this implementation, the attachment mechanism 338 includes a locking screw 402 and spring 404 positioned along each of the opposite end extension portions 107*a-b* of rake 106. In the example shown, the locking screw 402 is insertable through spring 404 and through apertures in the end extension portions 107*a-b* and the support 336, respectively. In this arrangement, the support 336 may include a mounting extension 337 having a shaped aperture positioned to receive the locking screw 402 therethrough, but which is non-circular such that, by turning the locking screw 402, an underside of the mounting extension 337 of support 336 is engaged. The locking screw 402 may be rotated, for example a quarter-turn (90 degrees) to engage an underside of that mounting extension, and the spring 404 may maintain tension on the locking screw to prevent unintended turning of the locking screw 402 that might cause disengagement of the rake 106 from the support 336. In some examples, the spring 404 may be affixed to the locking screw 402 to prevent it from coming loose during replacement of the rake 106.

Figure 14:
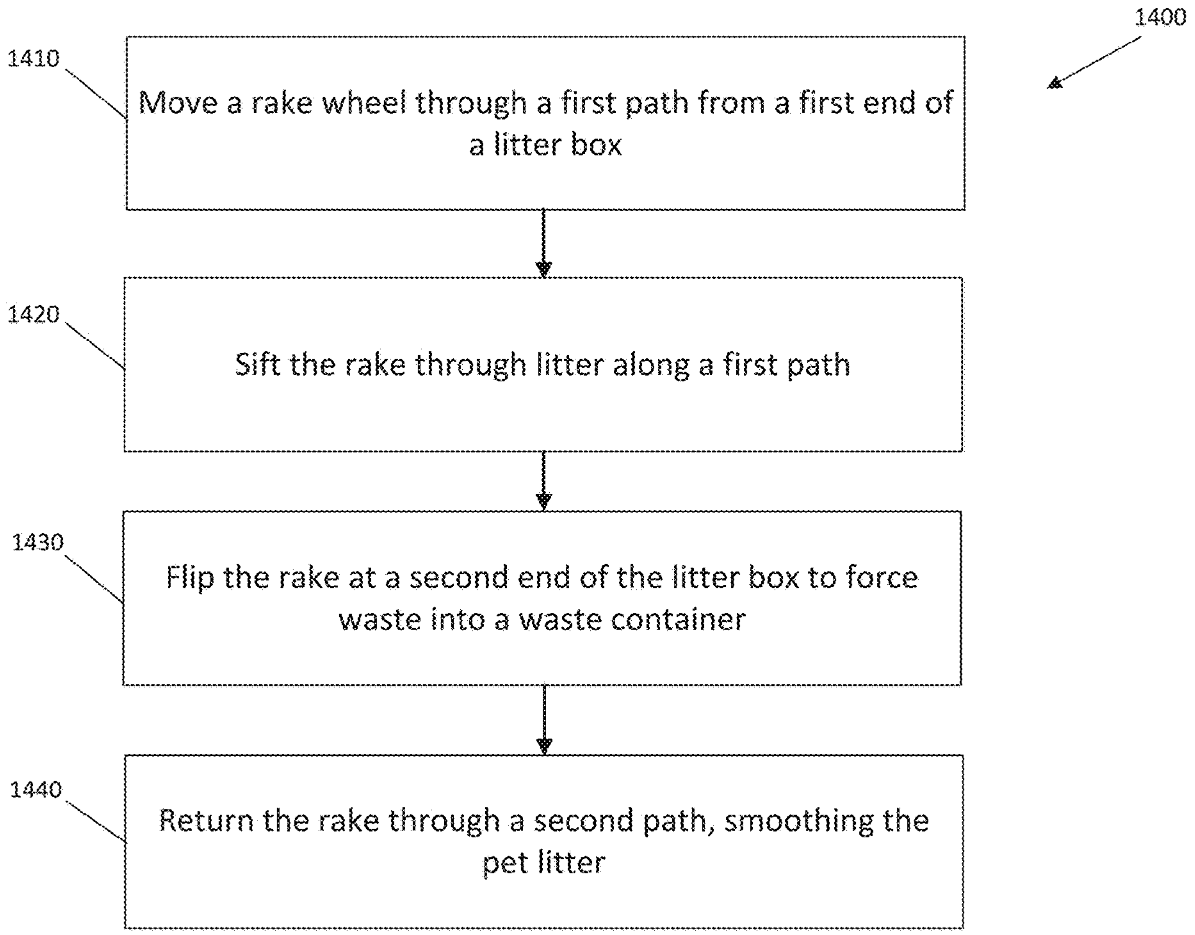
FIG. 14 illustrates an example method that can be implemented by a self-cleaning litter box system.

Referring now to FIG. 14, a flowchart of an example method 1400 that can be implemented by a self-cleaning litter box system is provided. The steps and operations discussed for the example method 1400 can be implemented by the components previously discussed for the self-cleaning litter box system 100.

At operation 1410, a rake moves through a first (forward) path from a first end of a litter box by using a motor. In the operation, a rake wheel, such as lower rake wheel 334, may travel along a forward wheel path 312 to define the forward path of the rake. Additionally, the motor moving the rake wheel can be motor 304.

At operation 1420, as the rake moves forward along a forward path and a rake wheel follows a forward rake wheel path, the rake sifts through litter within a litter pan. In this example, operation 1420 the rake can sift through the litter to pick up pet waste. The rake sifting through the litter may be rake 106. Also, the mentioned litter may be in litter pan 120.

At operation 1430, the rake passes an end gate and reaches an opposite end of the litter pan, and is flipped to force waste into a waste bin. Flipping the rake helps create a mechanical force/impact to make the waste fall off into a waste bin. The rake may also reach a free fall. Once the rake flips, waste is dumped into the waste bin, which helps eliminate clumps on the rake. This may reduce the extent to which a pet owner has to manually clean the rake.

At operation 1440, the rake is returned through a second path, from the second end of the litter box at the waste bin to the first end of the litter box. The first end of the litter box may be the home, or starting, side of the litter box where the rake rests while not in use. Also, the second path may be the return path defined by the return wheel path 314, and the rake assembly may follow the return wheel path 314 based on a position of the one-way gate 318 operating as the end gate. As the rake returns to the first end and the lower rake wheel 334 travels along the return wheel path 314, the rake may still be in a flipped orientation, and may remain leaned towards the end of the litter box including the waste bin. Once the rake approaches the end of the litter pan opposite the waste bin, the rake wheel may pass through a home gate, such as one-way gate 316. This second path of the rake, defined by the return wheel path 314, is higher than the first, or forward, path, and allows for the rake to be optimally placed in the litter for smoothing.

Additional operations not shown in FIG. 14 may also be included in method 1400. For example, the rake may be flipped back once the rake wheel returns to its home or original position. It may flip due to the rake assembly contacting a boss piece which applies a force to the rake resulting in it flipping back to its home or original position. Further steps may include a top rake wheel traversing a ramp to flip or assist in flipping the rake. Additionally, the disclosed steps do not require any particular order and the described order in method 1400 should not be seen as limiting.

The self-cleaning litter box system and methods described may include components not shown as well. For example, the self-cleaning litter box may include an electrical control system that determines when to actuate and power the motor 304. Further, it may include sensors to determine when the pet has used the litter box and has left. Examples of such systems are described in U.S. Pat. No. 9,179,643 B2 and U.S. Pat. No. 8,166,919 B2, which are incorporated herein by reference in their entireties.

Referring to FIGS. 1-14 generally, in some example aspects described herein "rotationally connected" or "rotationally attached" is defined as connecting in a way that as a first component rotates, either the second component rotates, or the first component rotates about the second component's axis. Additionally, "fixedly attach/connect" may refer to an arrangement in which two components are connected such that one component does not move relative to another component. Furthermore, "linearly attaching" is defined as attaching a first component to a second component so that the first component can move linearly relative to the second (for example, movement of the carrier block 322 relative to the leadscrew 306, allowing for the transmission of rotational energy into linear energy). Finally, "operably connect" is defined as connecting so that one component can cause another component to do an action.

The below examples represent possible configurations of a self-cleaning litter box that achieve at least some of the advantages and features described above.

In accordance with a first example, a self-cleaning litter box may comprise a chassis assembly having a first end and a second end, the chassis assembly including a side frame, a motor, a waste container at the second end of the chassis assembly, a litter container placed within a lower portion of the chassis assembly, a rake assembly including a rake, the rake assembly being movable between the first end and the second end of the chassis assembly, a carrier attached to the rake assembly, a drive mechanism operably connected to the carrier assembly, the drive mechanism being engageable by the motor to move the carrier assembly between the first end of the chassis assembly and a second end of the chassis assembly, a first guide path formed along the side frame, the first guide path defining a first path of travel of the rake from the first end toward the second end, and a second guide path formed along the side frame; the second guide path defining a second path of travel of the rake from the second end toward the first end, the second path of travel being higher than the first path along at least a portion of the side frame.

In accordance with a second example, the first example may be modified by the rake assembly including a support and at least one rake wheel, the at least one rake wheel being engaged by a carrier block slot of the carrier assembly and positioned adjacent the side frame, the at least one rake wheel being positioned to travel along the first guide path during movement of the carrier assembly from the first end of the chassis assembly toward the second end of the chassis assembly, the at least one rake wheel being positioned to travel along the second guide path during movement of the carrier assembly from the second end of the chassis assembly toward the first end of the chassis assembly.

In accordance with a third example, the second example may be modified by the at least one rake wheel comprising a lower rake wheel, the rake assembly further includes an upper rake wheel rotationally affixed to the support.

In accordance with a fourth example, the third example may be modified by the upper rake wheel being positioned to travel along a top rail of the side frame during movement of the carrier assembly between the first end of the chassis assembly and the second end of the chassis assembly.

In accordance with a fifth example, the fourth example may be modified to further comprise a boss positioned along the side frame at a position approaching the waste bin, the boss being positioned to engage a lower portion of the support as the carrier assembly approaches the waste bin, thereby pivoting the rake toward the waste bin about an axis defined by the lower rake wheel.

In accordance with a sixth example, the fifth example may be modified by the top rail including a ramp proximate the second end of the chassis assembly, the ramp adjusting relative angular positions of the upper rake wheel and the lower rake wheel to encourage pivoting of the rake toward the waste bin.

In accordance with a seventh example, the first through sixth examples may be modified by the drive mechanism including a leadscrew operably engaged by the motor via a gear assembly, the leadscrew having a threaded exterior and being rotated in response to operation of the motor, the leadscrew engaging the carrier assembly to move the carrier assembly axially along the leadscrew in response to rotation of the leadscrew.

In accordance with an eighth example, the first through seventh examples may be modified to further comprise an end gate positioned between the first guide path and the second guide path toward the waste bin, the end gate comprising a one-way gate.

In accordance with a ninth example, the first through eighth examples may be modified to further comprise a home gate positioned between the first guide path and the second guide path toward the first end, the home gate comprising a one-way gate.

In accordance with a tenth example, the first through ninth examples may be modified by the rake assembly further including an attachment mechanism attaching the rake to a support, the attachment mechanism including a spring-loaded locking screw.

In accordance with an eleventh example, the tenth example may be modified by the chassis assembly further including one or more access tabs, the one or more access tabs positioned above the spring-loaded locking screw when the rake assembly is located toward the first end of the chassis assembly.

In accordance with a twelfth example, a cleaning apparatus for a litter box, the cleaning apparatus may comprise a rake detachably attached to a support, a rake wheel rotationally attached to the support, a motor operably connected to the rake wheel, wherein the motor drives a carrier block operably attached to the support via the rake wheel, a side frame defining a forward wheel path and a return wheel path, wherein the forward wheel path positions the rake to pass at least partially through a litter tray at a first depth, and the return wheel path positions the rake to pass at least partially through the litter tray at a second depth shallower than the first depth.

In accordance with a thirteenth example, the twelfth example may be modified by wherein the first depth positioning the rake proximate to a bottom of the litter tray for at least a portion of the forward wheel path, and wherein the second depth positions at least a portion of the rake below an intended depth of litter within the litter tray.

In accordance with a fourteenth example, the twelfth and thirteenth examples may be modified by the first depth and the second depth being spaced apart by between 25-40 mm.

In accordance with a fifteenth example, the twelfth through fourteenth examples may be modified by at least one of the forward wheel path or the return wheel path defining a curvilinear path.

In accordance with a sixteenth example, the twelfth through fifteenth examples may be modified to further comprise a second wheel attached to the support, the second wheel comprising an upper rake wheel positioned to travel along a top rail of the side frame.

In accordance with a seventeenth example, the sixteenth example may be modified by positioning of the rake wheel and the upper rake wheel define an angular position of the rake as the rake wheel travels along the forward wheel path and the return wheel path, the angular position being variable along at least one of the forward wheel path and the return wheel path.

In accordance with an eighteenth example, the twelfth through seventeenth examples may be modified to further comprise a gear arrangement and a leadscrew, the gear arrangement operatively connecting the motor to the leadscrew to cause rotation of the leadscrew in response to operation of the motor.

In accordance with nineteenth example, the eighteenth example may be modified to further comprise a carrier assembly operatively connected to the leadscrew to move linearly along an axis of the leadscrew in response to rotation of the leadscrew, the carrier assembly including a carrier block slot receiving the rake wheel and guiding the rake wheel along the forward wheel path and the return wheel path.

In accordance with a twentieth example, the twelfth through nineteenth examples may be modified to further comprise an end gate and a home gate, the end gate and the home gate separating the forward wheel path from the return wheel path.

In accordance with a twenty-first example, a method for cleaning a litter box may comprise moving a rake wheel through a first path from a first end of a litter box by using a motor, while moving the rake wheel through the first path, sifting a rake through litter in a litter tray, flipping the rake at a second end of the litter box toward a waste bin, returning the rake wheel through a second path to the first end of the litter box, the second path being different from the first path, and wherein the rake is positioned along the second path to smooth the pet litter as the rake wheel returns.

In accordance with a twenty-second example, the twenty-first example may be modified to further comprise opening a waste lid covering the waste bin as the rake approaches the second end of the litter box via the first path.

In accordance with a twenty-third example, the twenty-second example may be modified to further comprise closing the waste lid as the rake returns toward the first end of the litter box via the second path.

The present disclosure is not to be limited in terms of the particular embodiments described in this application, which are intended as illustrations of various aspects. Many modifications and variations can be made without departing from its spirit and scope. Functionally equivalent methods and systems within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. The terminology used herein is for the purpose of describing particular embodiments only, and is not intended to be limiting.

The above specification, examples and data provide a complete description of the use of the invention. Since many embodiments of the invention can be made without departing from the spirit and scope of the invention, the invention resides in the claims hereinafter appended.

What is claimed is:

1. A self-cleaning litter box comprising:
- a chassis assembly having a first end and a second end, the chassis assembly including a side frame;
- a motor;
- a waste container at the second end of the chassis assembly;
- a litter container placed within a lower portion of the chassis assembly;
- a rake assembly including a rake, the rake assembly being movable between the first end and the second end of the chassis assembly, the rake assembly including an attachment mechanism attaching the rake to a support, the attachment mechanism including a spring-loaded locking screw;
- a carrier assembly attached to the rake assembly;
- a drive mechanism operably connected to the carrier assembly, the drive mechanism being engageable by the motor to move the carrier assembly between the first end of the chassis assembly and the second end of the chassis assembly;
- a first guide path formed along the side frame, the first guide path defining a first path of travel of the rake from the first end toward the second end; and
- a second guide path formed along the side frame, the second guide path defining a second path of travel of the rake from the second end toward the first end, the second path of travel being higher than the first path of travel along at least a portion of the side frame.

2. The self-cleaning litter box of claim 1, wherein the rake assembly includes at least one rake wheel, the at least one rake wheel being engaged by a carrier block slot of the carrier assembly and positioned adjacent the side frame, the at least one rake wheel being positioned to travel along the first guide path during movement of the carrier assembly from the first end of the chassis assembly toward the second end of the chassis assembly, the at least one rake wheel being positioned to travel along the second guide path during movement of the carrier assembly from the second end of the chassis assembly toward the first end of the chassis assembly.

3. The self-cleaning litter box of claim 2, wherein the at least one rake wheel comprises a lower rake wheel, the rake assembly further includes an upper rake wheel rotationally affixed to the support.

4. The self-cleaning litter box of claim 3, wherein the upper rake wheel is positioned to travel along a top rail of the side frame during movement of the carrier assembly between the first end of the chassis assembly and the second end of the chassis assembly.

5. The self-cleaning litter box of claim 4, further comprising a boss positioned along the side frame at a position approaching the waste bin, the boss being positioned to engage a lower portion of the support as the carrier assembly approaches the waste bin, thereby pivoting the rake toward the waste bin about an axis defined by the lower rake wheel.

6. The self-cleaning litter box of claim 5, wherein the top rail includes a ramp proximate the second end of the chassis assembly, the ramp adjusting relative angular positions of the upper rake wheel and the lower rake wheel to encourage pivoting of the rake toward the waste bin.

7. The self-cleaning litter box of claim 1, wherein the drive mechanism includes a leadscrew operably engaged by the motor via a gear assembly, the leadscrew having a threaded exterior and being rotated in response to operation of the motor, the leadscrew engaging the carrier assembly to move the carrier assembly axially along the leadscrew in response to rotation of the leadscrew.

8. The self-cleaning litter box of claim 1, further comprising an end gate positioned between the first guide path and the second guide path toward the waste bin, the end gate comprising a one-way gate.

9. The self-cleaning litter box of claim 1, further comprising a home gate positioned between the first guide path and the second guide path toward the first end, the home gate comprising a one-way gate.

10. The self-cleaning litter box of claim 1, wherein the chassis assembly further includes one or more access tabs, the one or more access tabs positioned above the spring-loaded locking screw when the rake assembly is located toward the first end of the chassis assembly.

11. A cleaning apparatus for a litter box, the cleaning apparatus comprising:
- a rake detachably attached to a support;
- an attachment mechanism attaching the rake to the support, the attachment mechanism including a spring-loaded locking screw;
- a rake wheel rotationally attached to the support;

a motor operably connected to the rake wheel, wherein the motor drives a carrier block operably attached to the support via the rake wheel;

a side frame defining a forward wheel path and a return wheel path, wherein the forward wheel path positions the rake to pass at least partially through a litter tray at a first depth; and the return wheel path positions the rake to pass at least partially through the litter tray at a second depth shallower than the first depth.

12. The cleaning apparatus of claim 11, further comprising a second wheel attached to the support, the second wheel comprising an upper rake wheel positioned to travel along a top rail of the side frame.

13. The cleaning apparatus of claim 12, wherein positions of the rake wheel and the upper rake wheel define an angular position of the rake as the rake wheel travels along the forward wheel path and the return wheel path, the angular position being variable along at least one of the forward wheel path and the return wheel path.

14. The cleaning apparatus of claim 11, further comprising a gear arrangement and a leadscrew, the gear arrangement operatively connecting the motor to the leadscrew to cause rotation of the leadscrew in response to operation of the motor.

15. The cleaning apparatus of claim 14, further comprising a carrier assembly operatively connected to the leadscrew to move linearly along an axis of the leadscrew in response to rotation of the leadscrew, the carrier assembly including a carrier block slot receiving the rake wheel and guiding the rake wheel along the forward wheel path and the return wheel path.

16. The cleaning apparatus of claim 11, wherein the first depth positions the rake proximate to a bottom of the litter tray for at least a portion of the forward wheel path, and wherein the second depth positions at least a portion of the rake below an intended depth of litter within the litter tray.

17. The cleaning apparatus of claim 11, wherein the first depth and the second depth are spaced apart by between 25-40 mm.

18. The cleaning apparatus of claim 11, wherein at least one of the forward wheel path or the return wheel path defines a curvilinear path.

19. The cleaning apparatus of claim 11, further comprising an end gate and a home gate, the end gate and the home gate separating the forward wheel path from the return wheel path.

* * * * *